US008209612B2

(12) United States Patent
Johnson

(10) Patent No.: US 8,209,612 B2
(45) Date of Patent: Jun. 26, 2012

(54) APPLICATION OF SPEED EFFECTS TO A VIDEO PRESENTATION

(75) Inventor: Gary Johnson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 229 days.

(21) Appl. No.: 12/762,747

(22) Filed: Apr. 19, 2010

(65) Prior Publication Data

US 2010/0275121 A1 Oct. 28, 2010

Related U.S. Application Data

(63) Continuation of application No. 10/686,990, filed on Oct. 15, 2003, now Pat. No. 7,725,828.

(51) Int. Cl.
*G06F 3/00* (2006.01)
*G06F 3/048* (2006.01)

(52) U.S. Cl. ........ 715/726; 715/719; 715/722; 715/723; 345/441; 345/442; 345/473; 345/475

(58) Field of Classification Search .................. 715/719, 715/720, 721, 722, 723, 727; 345/441, 442, 345/443, 467, 473, 474, 475
See application file for complete search history.

(56) References Cited

U.S. PATENT DOCUMENTS 5,521,841 A 5/1996 Arman et al.
5,613,909 A 3/1997 Stelovsky
5,634,020 A 5/1997 Norton
5,659,539 A 8/1997 Porter et al.
5,664,216 A 9/1997 Blumenau
5,682,326 A 10/1997 Klingler et al.
5,732,184 A 3/1998 Chao et al.
5,760,767 A 6/1998 Shore et al.
5,781,188 A * 7/1998 Amiot et al. .................. 715/723
5,892,506 A 4/1999 Hermanson
5,892,507 A 4/1999 Moorby et al.
5,893,062 A 4/1999 Bhadkamkar et al.
5,930,446 A 7/1999 Kanda
5,969,716 A 10/1999 Davis et al.

(Continued)

OTHER PUBLICATIONS

Portions of prosecution history of U.S. Appl. No. 10/686,990, Mar. 29, 2010, Johnson, Gary.

(Continued)

*Primary Examiner* — Steven B Theriault
(74) *Attorney, Agent, or Firm* — Adeli & Tollen LLP

(57) ABSTRACT

Some embodiments provide a method of specifying speed effects for playing a video clip. The method defines a set of speed effects for the video clip. It then displays in real-time a presentation of the video clip that accounts for the set of speed effects defined for the video clip. In some embodiments, this method represents the playback speed of a video clip in terms of a graph that is part of a graphical user interface ("GUI"). This graph is defined along two axes, with one axis representing the playback time, and the other axis representing the content-time (i.e., the time within the video clip). In these embodiments, a user can change the playback speed of the video clip by using a set of GUI operations to select and modify the graph. For instance, a user can select and adjust the graph at different instances in time in order to change the playback speed of the video clip at these instances. Different embodiments use different types of graphs to represent playback speed. For instance, some embodiments use a deformable line bar that is superimposed on a rectangle that represents the video clip.

20 Claims, 10 Drawing Sheets

U.S. PATENT DOCUMENTS 5,999,173 A 12/1999 Ubillos
6,054,984 A 4/2000 Alexander
6,108,011 A * 8/2000 Fowler .......................... 345/441
6,134,380 A 10/2000 Kushizaki
6,154,221 A * 11/2000 Gangnet ....................... 345/442
6,154,600 A 11/2000 Newman et al.
6,154,601 A 11/2000 Yaegashi et al.
6,188,396 B1 2/2001 Boezeman et al.
6,204,840 B1 3/2001 Petelycky et al.
6,262,776 B1 7/2001 Griffits
6,314,403 B1 11/2001 Jeffery
6,324,335 B1 11/2001 Kanda
6,404,978 B1 6/2002 Abe
6,414,686 B1 7/2002 Protheroe et al.
6,477,315 B1 11/2002 Ohomori
6,538,651 B1 * 3/2003 Hayman et al. ............... 345/419
6,542,692 B1 4/2003 Houskeeper
6,546,188 B1 4/2003 Ishii et al.
6,559,868 B2 5/2003 Alexander et al.
6,573,898 B1 6/2003 Mathur et al.
6,650,826 B1 11/2003 Hatta
6,658,194 B1 12/2003 Omori
6,744,968 B1 6/2004 Imai et al.
6,763,175 B1 7/2004 Trottier et al.
6,847,373 B1 * 1/2005 Gonsalves et al. ............ 345/589
6,848,117 B1 1/2005 Emura
6,873,344 B2 3/2005 Samra et al.
6,928,613 B1 8/2005 Ishii et al.
6,990,512 B1 1/2006 Major et al.
7,020,381 B1 3/2006 Kato et al.
7,030,872 B2 * 4/2006 Tazaki .......................... 345/418
7,043,137 B2 5/2006 Slone
7,073,127 B2 7/2006 Zhao et al.
7,085,683 B2 8/2006 Anderson et al.
7,194,676 B2 3/2007 Fayan et al.
7,207,007 B2 * 4/2007 Moriwake et al. ............ 715/723
7,317,457 B2 * 1/2008 Felt ............................... 345/473
7,319,764 B1 1/2008 Reid et al.
7,725,828 B1 5/2010 Johnson
2001/0020953 A1 9/2001 Moriwake et al.
2002/0140719 A1 10/2002 Amir et al.
2002/0168176 A1 11/2002 Iizuka et al.
2003/0016254 A1 1/2003 Abe
2003/0164845 A1 9/2003 Fayan et al.
2004/0001079 A1 1/2004 Zhao et al.
2004/0001694 A1 1/2004 Evans et al.
2004/0012594 A1 1/2004 Gauthier et al.
2004/0027369 A1 2/2004 Kellock et al.
2004/0151469 A1 8/2004 Engholm et al.
2004/0267952 A1 12/2004 He et al.
2005/0025320 A1 2/2005 Barry
2005/0041029 A1 * 2/2005 Felt ............................... 345/473
2005/0042591 A1 2/2005 Bloom et al.
2005/0151627 A1 7/2005 Chen
2005/0201724 A1 9/2005 Chu
2005/0216840 A1 9/2005 Salvucci
2006/0150072 A1 7/2006 Salvucci
2006/0168521 A1 7/2006 Shimizu et al.
2006/0253781 A1 11/2006 Pea et al.
2008/0062177 A1 * 3/2008 Gaul et al. .................... 345/440
2009/0297022 A1 * 12/2009 Pettigrew et al. ............. 382/162

OTHER PUBLICATIONS

Author Unknown, "Apple Announces Final Cut Pro 4," NAB, Las Vegas, Apr. 6, 2003, Apple Inc., Las Vegas, Nevada, USA.
Brenneis, Lisa, "Final Cut Pro 3 for Macintosh: Visual QuickPro Guide," Apr. 2002, Peachpit Press, Berkeley, California, USA.
Martin, Steve, "Final Cut Express System Requirements, OS 10.2 or Higher," Jan. 13, 2003, Ripple Training.
Sauer, Jeff, "Review: Apple Final Cut Pro 4," Oct. 3, 2003.
Stone, Ken, "Basic Keyframing in Final Cut Express", Jan. 27, 2003, V. 1.0.1, Ken Stone.
Stone, Ken, "Motion Paths and the Bezier Handle in FCP," Aug. 13, 2001, Ken Stone.

* cited by examiner

900
| Playback Time |
| --- |
| Content Time |
| Coordinates of inbez knob |
| Coordinates of outbez knob |
*Figure 9*
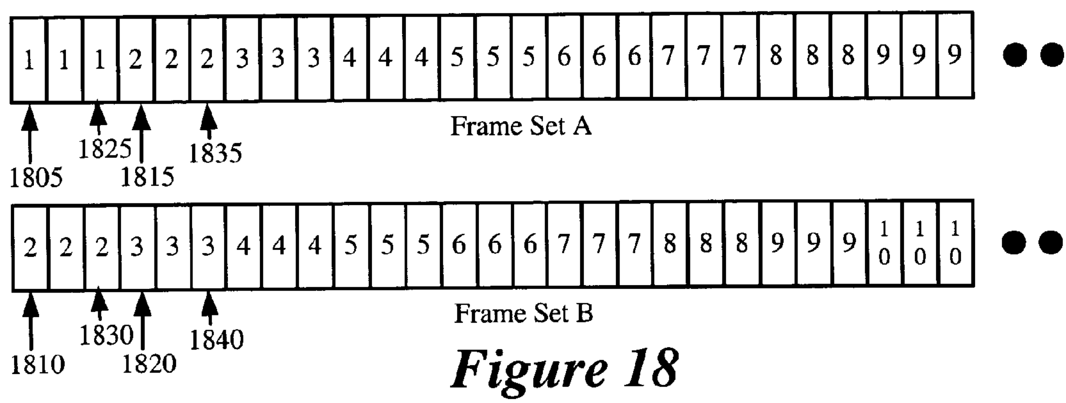
*Figure 18*
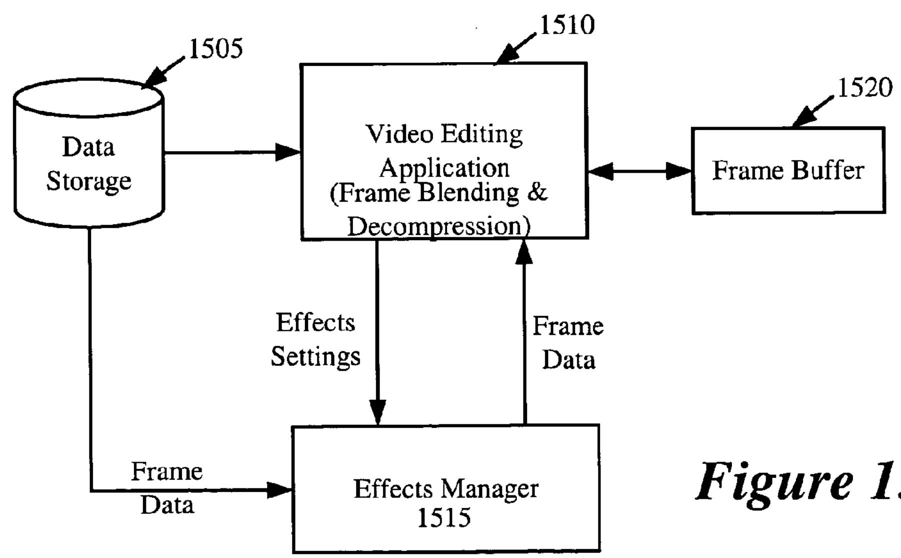
*Figure 15*

APPLICATION OF SPEED EFFECTS TO A VIDEO PRESENTATION

CLAIM OF BENEFIT TO PRIOR APPLICATIONS

This application is a continuation application of U.S. patent application Ser. No. 10/686,990, filed Oct. 15, 2003 and issued as U.S. Pat. No. 7,725,828 on May 25, 2010. U.S. Pat. No. 7,725,828 is hereby incorporated herein by reference.

FIELD OF THE INVENTION

The present invention is directed towards the application of speed effects to a video presentation.

BACKGROUND OF THE INVENTION

In recent years, there has been a proliferation of video editing applications. These applications allow a user to create video presentations by combining one or more video and audio tracks, and applying one or more video and/or audio effects to these tracks. Speed effects are one type of effects that are commonly employed by video editing applications. Speed effects allow a user to specify different speeds for playing different sections of the presentation. For instance, by using speed effects, an editor can divide a video presentation into three parts, where the first part plays at twice its created rate (e.g., at 60 frames per second (fps) for a content rate of 30 fps), the second part plays at half its created rate (e.g., at 15 fps for a content rate of 30 fps), and the third part plays at 3 times its content rate (e.g., at 90 fps for a content rate of 30 fps).

Applying speed effects with prior video editing applications is often difficult and time consuming. Specifically, prior video editing applications do not apply speed effects to presentations in real-time. For instance, each time a user (also referred to below as an editor) specifies a new set of speed effects, some prior editing applications render a new media file with the speed effect. This rendering is quite time consuming. Also, if the editor is not happy with the rendered results, the editor would have to re-specify the speed effects, and re-render the media file once again. In addition, while the user is specifying new speed effects, this editing application does not provide adequate feedback regarding the frames on which the speed effects are being defined.

Therefore, there is a need for a method that can apply speed effects to a presentation and display the results of this application in real-time. Ideally, this method can apply the speed effects and display the results without having to render the presentation. Furthermore, ideally, this method would use an intuitive interface that allows the editor to easily specify speed effects and to discern the result of these effects.

SUMMARY OF THE INVENTION

Some embodiments provide a method of specifying speed effects for playing a video clip. The method defines a set of speed effects for the video clip. It then displays in real-time a presentation of the video clip that accounts for the set of speed effects defined for the video clip. In some embodiments, this method represents the playback speed of a video clip in terms of a graph that is part of a graphical user interface ("GUI"). This graph is defined along two axes, with one axis representing the playback time, and the other axis representing the content-time (i.e., the time within the video clip). In these embodiments, a user can change the playback speed of the video clip by using a set of GUI operations to select and modify the graph. For instance, a user can select and adjust the graph at different instances in time in order to change the playback speed of the video clip at these instances. Different embodiments use different types of graphs to represent playback speed. For instance, some embodiments use a deformable line bar that is superimposed on a rectangle that represents the video clip.

BRIEF DESCRIPTION OF THE DRAWINGS

The novel features of the invention are set forth in the appended claims. However, for purpose of explanation, several embodiments of the invention are set forth in the following figures.

FIGS. 3-14 illustrate examples of GUI operations that are performed on the deformable line bar illustrated in FIGS. 1A and 1B.

FIG. 15 illustrates the software architecture of some embodiments of the invention.

FIG. 18 illustrates that an effects manager provide two sets of frames to the video-editing application when a frame-blending option has been selected.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method of specifying speed effects for playing a video clip. A video clip can be a composite of one or more video clips, one or more audio tracks, and one or more video and audio effects. A video clip includes a number of frames, which are typically presented at a particular frame rate (e.g., at 25 fps, 30 fps, 60 fps). At times, each frame is presented in terms of two consecutive fields (e.g., is presented at 50 or 60 fields per second for a 25 or 30 fps video clip).

The method of some embodiments defines a set of speed effects for the video clip. It then displays in real-time a presentation of the video clip that accounts for the set of speed effects defined for the video clip. In some embodiments, this method represents the playback speed of a video clip in terms of a graph that is part of a graphical user interface ("GUI"). This graph is defined along two axes, with one axis representing the playback time, and the other axis representing the content-time (i.e., the time within the video clip). In these embodiments, a user can change the playback speed of the video clip by using a set of GUI operations to select and modify the graph. For instance, a user can select and adjust the graph at different instances in time in order to change the playback speed of the video clip at these instances.

I. Graphical User Interface

Figure 1A:
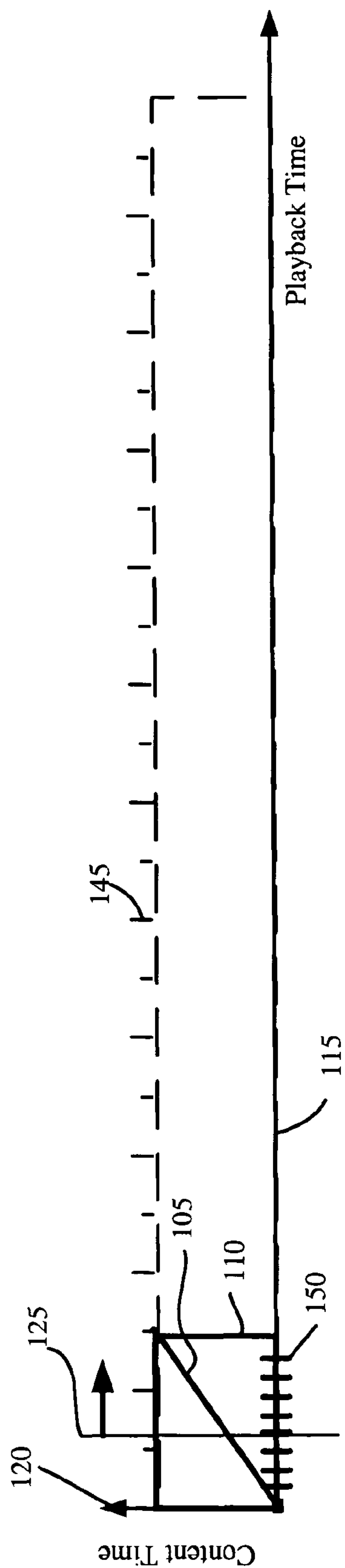
FIGS. 1A and 1B illustrate a deformable line bar that is used in some embodiments to define speed effects.
Figure 1B:
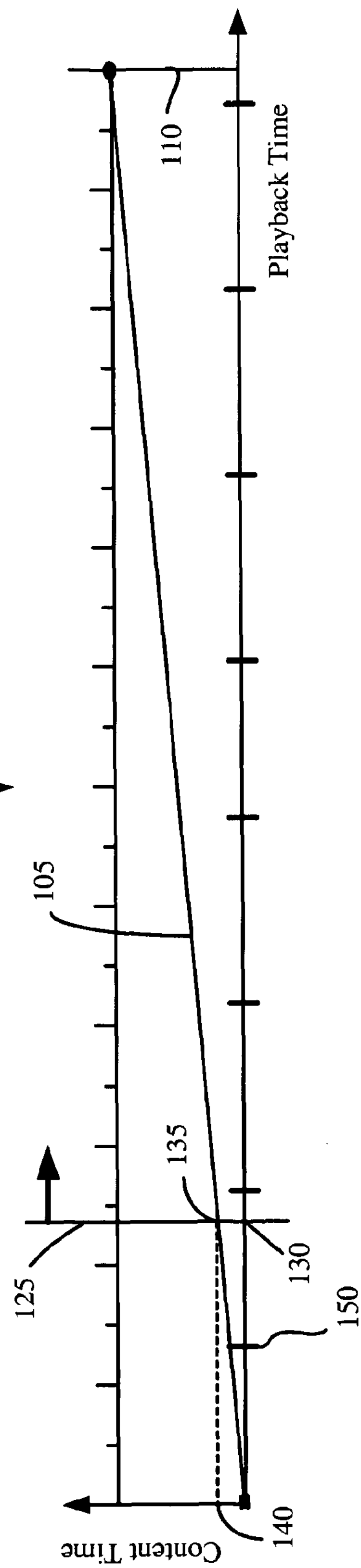

Different embodiments use different types of graphs to represent playback speed. For instance, some embodiments described below use a deformable line bar to represent the playback speed. Specifically, FIGS. 1A and 1B illustrate a deformable line bar 105 that is superimposed on a rectangular box 110, which is a graphical representation of a video clip. In some embodiments, the line bar 105 and the rectangular box 110 are part of a graphical user interface ("GUI") with which the user can interact through traditional GUI operations, such as click operations (e.g., to select an item), click-and-drag operations (e.g., to move an item), etc.

FIGS. 1A and 1B also illustrate a playback timeline 115, a content timeline 120, and a time marker 125. The timelines 115 and 120 are two axes along which the speed bar 105 is defined. The playback timeline 115 represents the time during the playback of a video clip, while the content timeline represents the time within the video clip. When an editor has not specified any speed effect for a video clip, the clip's duration along the playback timeline 115 is the same as the clip's duration along the content timeline 120. FIG. 1A illustrates such a case (i.e., illustrates a case where the editor has not specified any speed effect). As illustrated in this figure, the slope of the speed bar 105 is 45° in this case, since the playback and content timelines 115 and 120 have the same scale in this example.

On the other hand, when the editor specifies one or more speed effects for the video clip, the clip's playback duration will be different than the clip's content duration. For instance, FIG. 1B illustrates an example where the editor defines a constant speed effect that specifies the playback speed as $1/10^{th}$ the content speed. In this example, the speed bar has a constant slope of 0.1, since the two timelines have the same scale.

The time marker 125 identifies the portion of the video clip that is displayed at each instance in time. Specifically, when the video clip is playing, the time marker 125 moves along the timeline 115 at a particular playback rate (e.g., 25, 30, or 60 fps). The intersection of this marker at a particular playback time with the speed bar 105 identifies the video frame that is to be displayed at the particular time. For example, in FIG. 1B, the marker 125 at playback time 130 intersects the speed graph at point 135, which occurs at time 140 along the content timeline 120. Accordingly, in this example, the frame that is to be displayed at playback time 130 is the frame that appears in the video clip at time 140 of the video clip. A user can drag the time marker 125 to a particular time on the timeline 115 to view the video-clip frame at that time.

Figure 2:
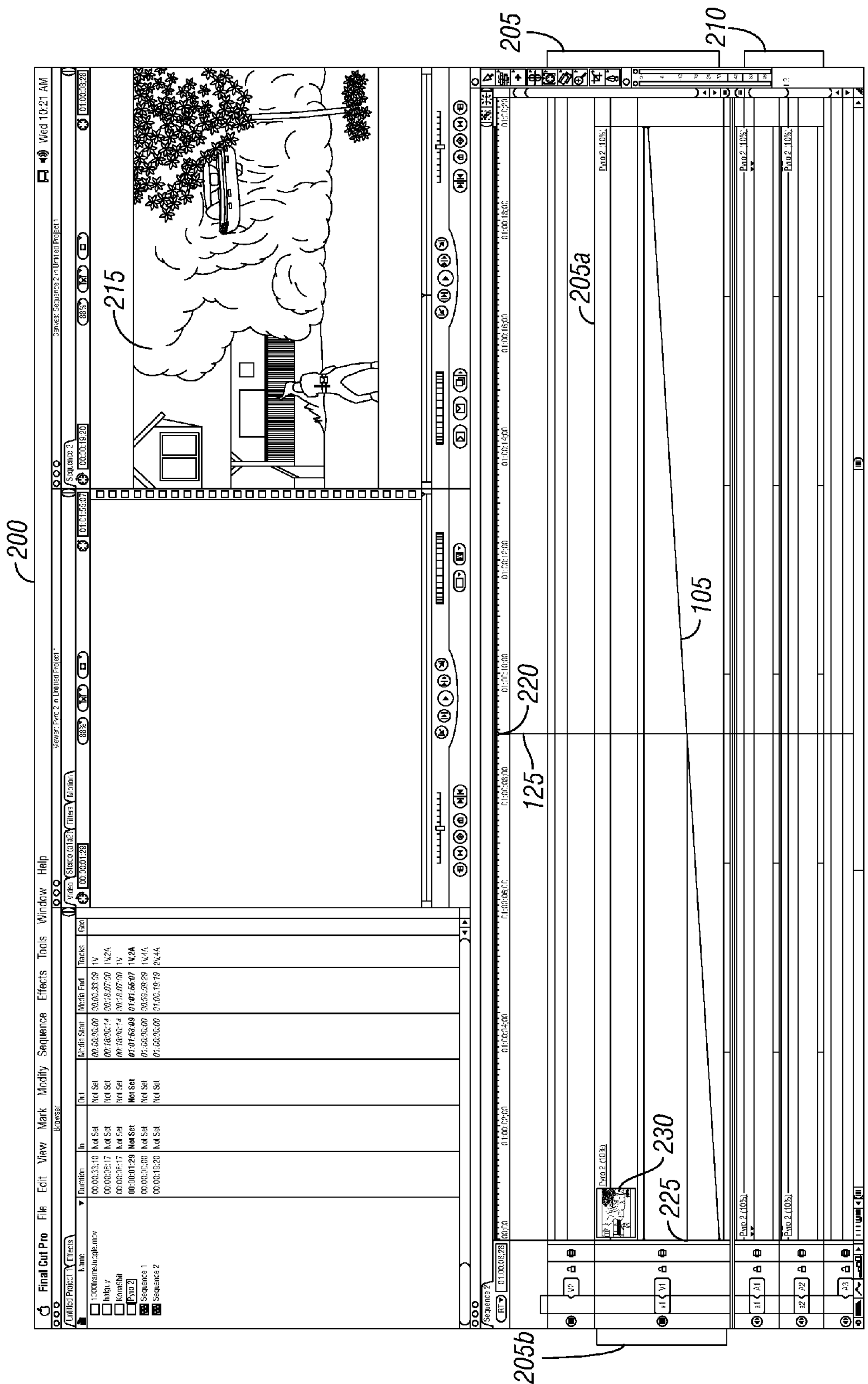
FIG. 2 illustrates a graphical user interface that uses the deformable line bar illustrated in FIGS. 1A and 1B.

The GUI of some embodiments of the invention have a preview window that displays the frame at the intersection of the time marker 125 and the speed bar 105. FIG. 2 illustrates one such GUI 200. In this illustration, the GUI 200 displays two tracks 205 for inserting, stacking, and editing video clips, and three tracks 210 for inserting, stacking, and editing audio tracks. It also illustrates the intersection of the time marker 125 and the speed bar 105 at playback time 220 and content time 225. In addition, it illustrates that the GUI 200 has a preview window 215. In this figure, the preview window 215 is presenting the frame that appears in the video clip on the video track 205*b* at time 225 (i.e., at the content time of the intersection of the timer marker 125 and the speed bar 105).

As illustrated in FIGS. 1A and 1B, some embodiments illustrate values 145 along the playback timeline 115 on top of the video-clip box 110. This has the advantage of allowing one set of playback time values 145 to be specified for several video and audio tracks 205 and 210 that are being displayed in the GUI of a video editing application, as illustrated in FIG. 2.

Also, displaying the playback time values on top of the video-clip box 110 frees up the bottom side of these boxes for placing speed indicators 150. Speed indicators are marks placed along the playback time line 115 to indicate how the video clip's frames are extended or condensed by the speed effects specified by the editor. The speed indicators 150 move closer and further as the frames are set to appear closer and further apart. In other words, the distance between the speed indicators illustrates the speed effects that are being achieved. In some cases, an editor might forego viewing the speed bar and instead perform speed adjustments by simply relying on the speed indicators. As further described below, the speed indicators in some embodiments have one color (e.g., black) when the edited presentation traverses forward through a video clip and have another color (e.g., red) when the presentation traverses backwards through the clip.

Through the speed bar 105, an editor can easily add or modify speed effects to a video clip. Specifically, the editor can change the playback speed at any point in the playback time by deforming the speed bar 105 at that point in time. For instance, in some embodiments, a user can deform the speed bar 105 through a simple click-and-drag operation.

Figure 3:
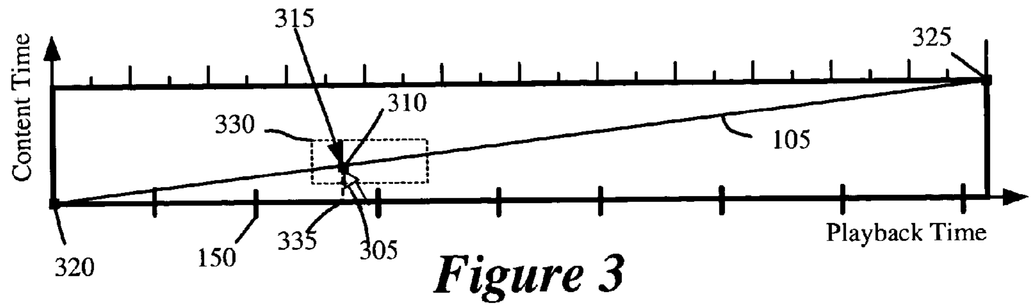

FIGS. 3-13 illustrate examples of click-and-drag operations in some embodiments. FIG. 3 shows the start of a click-and-drag operation. In this figure, the click-and-drag operation is started by placing a cursor 305 at a location 310 on the speed bar 105 and performing a click-and-hold operation (e.g., depressing a mouse button and holding this button depressed). As shown in FIG. 3, the moment that the user starts the click-and-hold operation at a location 310, a "keyframe" 315 is defined on the speed bar 105 at the location 310. A keyframe is a point along the speed bard 105 that is used to define and draw the speed bar, as further described below. As shown in FIG. 3, a speed bar has at least two keyframes, one 320 at its beginning and one 325 at its end. The editor can add new keyframes between the endpoint keyframes to give the speed bar any desire shape. If the keyframe 315 was defined at location 310 previously, the click-and-hold operation (that starts the click-and-drag operation) would not create another keyframe at the location 310, but rather would simply select the previously defined keyframe. The editor can also delete a previously defined keyframe. For instance, in some embodiments, the editor can delete a keyframe by pressing the control key, performing a click-and-hold operation on a keyframe, and selecting a "delete" option that appears in a menu window that appears after the click operation. When a keyframe is deleted, the speed bar is redrawn to account for the deletion.

A keyframe along the speed bar specifies the exact playback time for a frame that is within a video clip at a particular content time. This specification, in turn, allows an editor to specify any arbitrary traversal and speed for this traversal through the video clip. The editor can add or edit speed-effects by adding, deleting, and moving keyframes on the speed bar.

More specifically, as shown in FIG. 3, a rectangle 330 appears about the location 310 on which the click-and-hold operation is performed. This rectangle is a graphical representation of the video clip. The horizontal length of this rectangle is a pictorial representation of the video clip. Accordingly, this rectangle's horizontal alignment with the keyframe 315 appearing at 310 provides a quick indication of the location of the video-clip frame that is currently set to appear at the playback-time value 335 of the location 310.

Figure 4:
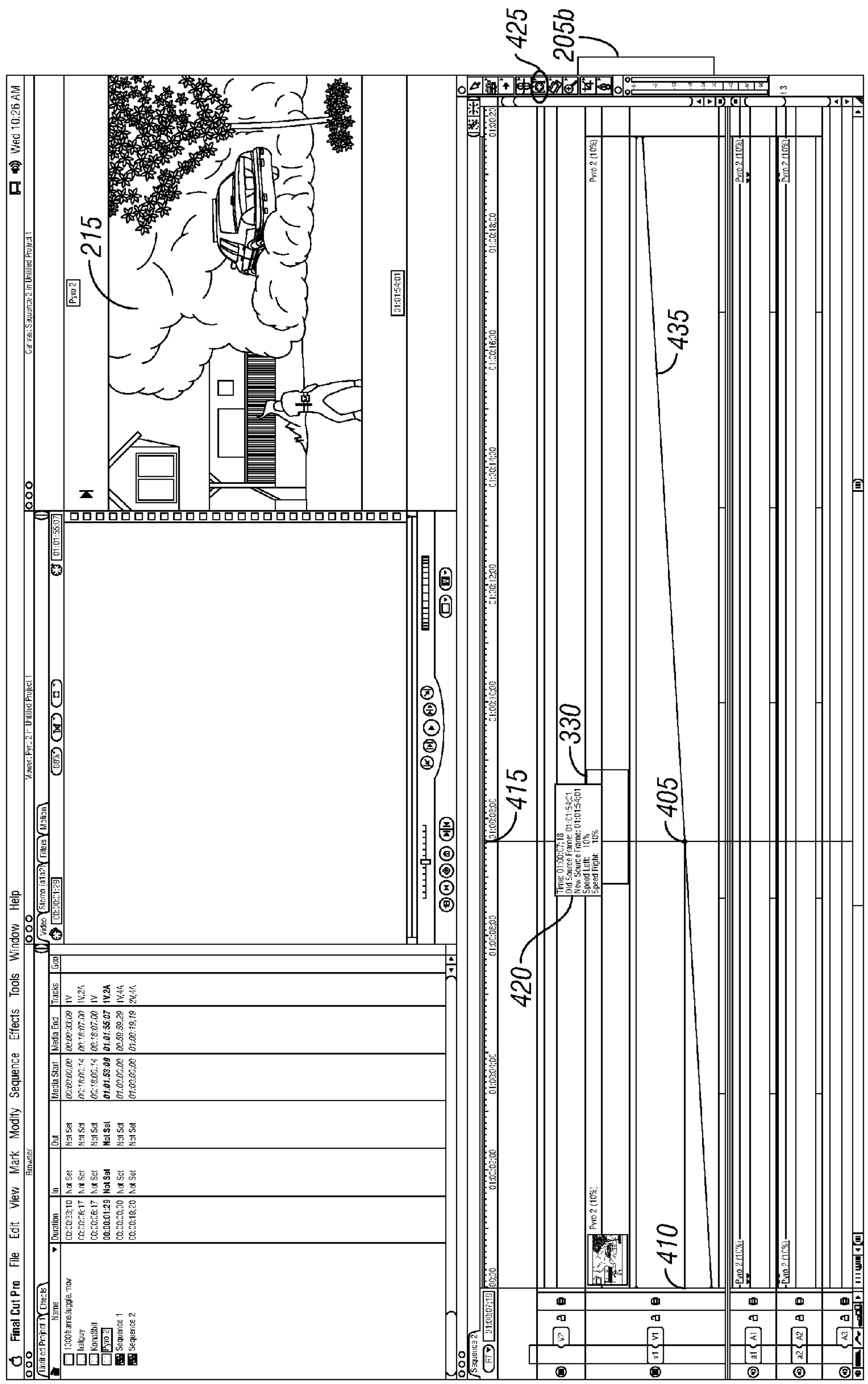

Some embodiments display in a preview window the frame that is set to appear at the playback-time value of a newly defined keyframe or of a selected, previously defined keyframe. For instance, FIG. 4 illustrates a frame in the preview window 215 when the keyframe 405 is defined or selected. This frame is a frame that appears within the video clip at the content-time value 410 of the keyframe 405, and that is set to appear in the playback presentation at the playback-time value 415 of the keyframe 405. The preview display of a frame associated with a keyframe provides an editor with an immediate visual feedback regarding the playback presentation, and thereby facilitates the editor's speed effects editing.

As shown in FIG. 4, some embodiments display a chart 420 next to the rectangle 330 (that represents the video clip) when a keyframe is selected, altered, or defined. This chart lists a variety of statistics regarding the keyframe. In the example illustrated in FIG. 4, these statistics include the keyframe's playback-time value, the speed bar's slope to the left and right of the keyframe, and the keyframe's content-time value before and during the click-and-drag operation.

FIG. 4 further illustrates a speed-effects icon 425. In some embodiments, the editor can use this icon to display certain speed-effect data and enable certain speed-effect functionality. For instance, in some embodiments, the data chart 420 and video-clip rectangle 335 appear for a selected keyframe once the speed-effects icon 425 is selected.

In addition, after the user clicks on the speed-effect icon 425, the user can create a keyframe at a particular playback time, by clicking the cursor somewhere in the video track 205*b* and dragging the cursor to the particular playback time. This click-and-drag operation, in some embodiments, initially directs the application to display a playhead and a keyframe at the intersection of this playhead and the speed bar (assuming no keyframe was previously defined at this intersection; if such a keyframe was previously defined, the operation selects the previously defined keyframe instead of creating a new one). Subsequently, as the editor drags the cursor, the playhead scrolls across the speed bar and the keyframe moves across this graph, until reaching the particular playback time.

Some embodiments also allow an editor to create a keyframe at a particular playback time and a particular content time by simply clicking on the speed bar at the intersection of the particular playback and content times. The editor can direct the application to display the speed bar through a variety of ways. One way is to press the control key and click within the video track 205*b*. This operation directs the application to display a menu window, which has one option that the editor can select to view the speed bar.

Figure 5:
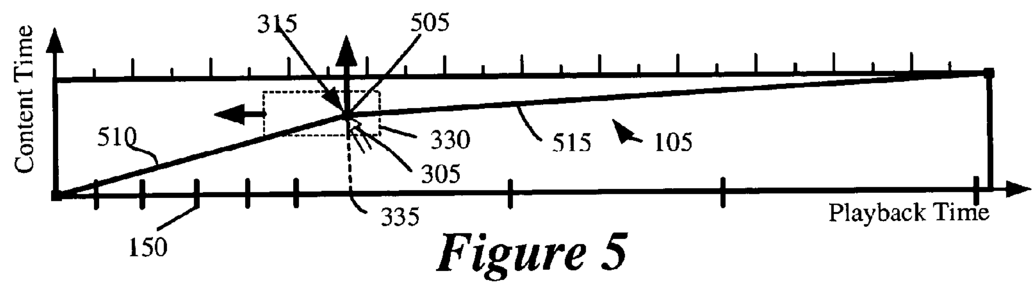

FIG. 5 shows the keyframe 315 after it has been moved to a new position 505. This movement can be achieved by starting a click-and-drag operation at 310 (as shown in FIG. 3), and dragging the cursor up towards 505. This movement moves the video-clip rectangle 330 to the left, since it moves the keyframe 315 to a later point along the content timeline. Specifically, when the keyframe is moved from 310 to 505, the video-clip rectangle 330 scrolls leftwards across the keyframe.

In FIG. 5, the motion of the keyframe from 310 to 505 could also be achieved by dragging the cursor to the right after starting the click-and-hold operation at 310. To the editor, this dragging would be visually perceived as moving the video-clip rectangle 330 to the left and moving the keyframe 315 up, which would correspond to moving to a later content time in the video clip.

Figure 6:
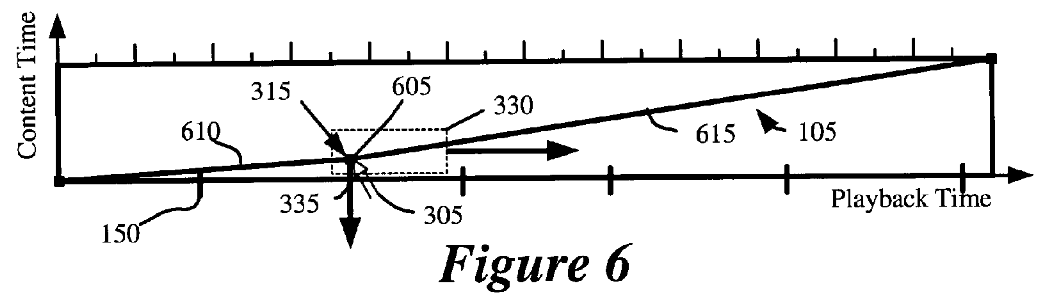

FIG. 6 shows the keyframe 315 after it has been moved to a new position 605. This movement can be achieved by starting a click-and-drag operation at 310 (as shown in FIG. 3), and dragging the cursor down towards 605. This movement moves the video-clip rectangle 330 to the right, since it moves the keyframe 315 to an earlier point along the content timeline. Specifically, when the keyframe is moved from 310 to 605, the video-clip rectangle 330 scrolls rightwards across the keyframe.

In FIG. 6, the motion of the keyframe from 310 to 605 could also be achieved by dragging the cursor to the left after starting the click-and-hold operation at 310. To the editor, this dragging would be visually perceived as moving to an earlier content time in the video-clip rectangle 330 in order to move the keyframe 315 down.

When the keyframe moves along the content timeline (e.g., when it is dragged from 310 to 505 or to 605), the frames that appear in a preview window 215 change in some embodiments. In other words, whenever a keyframe makes a transition along the content timeline that corresponds to a transition from a first frame to a second frame, the display in the preview window 215 changes from the first frame to the second. The frames in the preview window change with the movement of the keyframe along the content timeline in order to help the editor associate a particular frame with a particular keyframe (i.e., to select a particular frame to appear at a particular playback time).

In some embodiments, the movement of the keyframe and the video-clip rectangle can be modified during a click-and-drag operation by pressing a particular key. For instance, some embodiments scroll through the frames one frame at a time when the command key is pressed during a click-and-drag operation that moves a keyframe along the content timeline. In addition, some embodiments scroll through the frames by jumping along the content timeline at 10% speed intervals, when the shift key is pressed during a click-and-drag operation that moves a keyframe along the content timeline.

Figure 7:
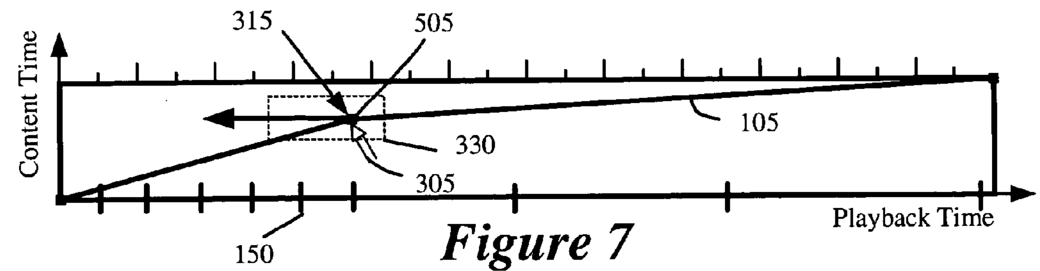
Figure 8:
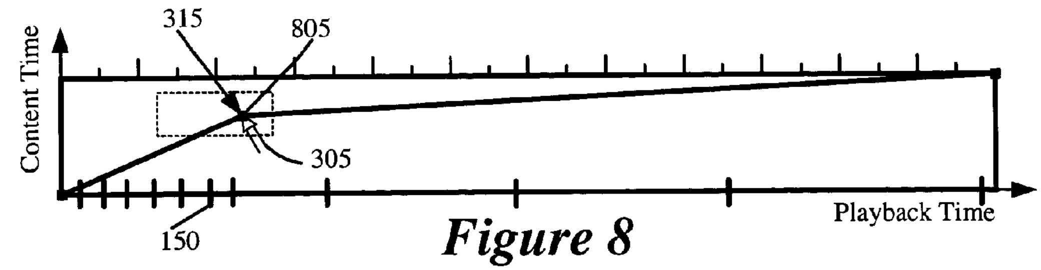

Also, when the option is key pressed during a click-and-drag operation that drags the cursor left or right, some embodiments move the keyframe left or right instead of scrolling through the frames. In other words, during such a click-and-drag operation, these embodiments keep the keyframe tied to the frame that the keyframe was associated with at the start of the click-and-drag operation, and just translate the cursor movement to the motion of the keyframe along the playback timeline. In essence, this motion moves the keyframe's associated frame to an earlier or later point in the playback timeline. FIGS. 7 and 8 illustrate an example of moving the keyframe 315 left from position 505 to position 805 in the speed bar's coordinate system, by pressing the option key while performing a click-and-drag operation that moves the cursor 305 left.

Although a set of operations have been described above for modifying the position of keyframes and video-clip rectangles, one of ordinary skill will realize that other embodiments might use a different set of operations to change the position of keyframes and video-clip rectangles. For instance, without requiring the pressing of any keyboard key, some embodiments might move the keyframe left or right when the click-and-drag operation moves the cursor left or right. These embodiments might then move the keyframe up or down when a particular key (e.g., the option key) is pressed and a click-and-drag operation moves the cursor left or right.

As illustrated in FIGS. 3-8, the movement of a keyframe changes the shape of the speed bar. For instance, in FIG. 3, the speed bar 105 has a constant slope of 0.1, which indicates a constant playback speed that is one tenth the speed of video clip. However, when in FIG. 5 the keyframe 315 is added and moved up to position 505, the shape of the speed bar changes from a straight line to two line segments 510 and 515. The slope of the line segment 510 is greater than the line segment 515 to indicate that the playback speed is faster prior to playback time 335 (at the point that the line segment 510 terminates) than the playback speed after the playback time 335 (at the point that the line segment 515 starts).

On the other hand, when in FIG. 6 the keyframe 315 is moved down to position 605, the shape of the speed bar is specified by two line segments 610 and 615, where in this case the slope of the first line segment 610 is less than the slope of the second line segment 615. These differing slopes indicate that the playback speed is slower before playback time 335 (at the point that the line segment 610 terminates) than the playback speed after the playback time 335 (at the point that the line segment 615 starts).

FIGS. 3-8 illustrate that the speed indicators 150 get closer to each other when the slope of the speed bar increases, and get further apart when the slope of the speed bar decreases. For instance, in FIG. 3, the speed indicators 150 are evenly spaced apart to indicate the constant slope of the speed bar 105 (i.e., to indicate the constant speed effect). However, in FIG. 5, the speed indicators 150 are closer before the playback time 335 (at the point that the line segment 510 terminates) than the speed indicators after the playback time 335 (at the point that the line segment 515 starts). These differing spacings are a visual indication that the playback speed is faster before 335 than it is after 335 (i.e., that the slope of the line segment 510 is greater than the slope of the line segment 515). Conversely, in FIG. 6, the speed indicators 150 are farther apart before the playback time 335 than the speed indicators after the playback time 335, in order to provide a visual indication that the playback speed is slower before 335 than it is after 335 (i.e., that the slope of the line segment 610 is less than the slope of the line segment 615).

Once the editor positions a keyframe at a desired location, the editor terminates the click-and-drag operation (e.g., releases the mouse button). At this point, the playback and content timeline values of the keyframe are set. FIG. 9 conceptually illustrates a keyframe data structure 900. As shown in this figure, this data structure includes a playback time and a content time, which correspond to the playback and content timeline values of a keyframe.

This figure also illustrates that the data structure includes two other attributes, which are the coordinates of an inbez knob and the coordinates of an outbez knob. These coordinates are defined in the coordinate system that is specified by the playback and content timelines 115 and 120. The inbez and outbez knobs are two additional points that are associated with each keyframe. These two knobs are used to draw a smooth curve through each keyframe.

Figure 10:
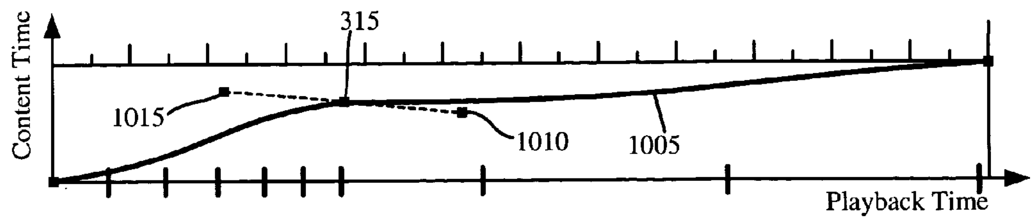

Specifically, some embodiments allow an editor to specify a speed bar that is a smooth spline curve, instead of one or more line segments. For instance, FIG. 10 illustrates a smooth speed-bar curve 1005 that is a smoothed-out version of the speed bar illustrated in FIG. 5. FIG. 10 illustrates the outbez knob 1010 and the inbez knob 1015 of the keyframe 315. By changing the position of these knobs, the editor can change the shape of the speed bar. For instance, in FIG. 10, the editor can add to the curvature of the speed bar about the keyframe 315 by moving the outbez knob 1010 down and/or moving the inbez knob 1015 up. In some embodiments, the outbez and inbez knobs can move independently of each other, although their default operation is to move one when the other one is moved; in these embodiments, the default operation can be usurped and a particular knob can move independently of the other by pressing designated key or keys (e.g., the space bar and/or the command key) while moving the particular knob.

Every keyframe has inbez and outbez knobs. However, the inbez knob of the keyframe at the start of the playback time, and the outbez knob of the keyframe at the end of the playback time are set to default values, which are not changeable by the editor. Also, when the speed bar is a straight line, the values of these knobs are set to default values that are ignored, as these knobs are not moveable by the editor when the speed bar is a straight line. An editor can direct the application to create and display the inbez and outbez knobs of a keyframe by pressing the control key, performing a click-and-hold operation on the keyframe, and then choosing a “smooth” option in a menu that appears after the click.

The inbez and outbez knobs of the keyframes are used to generate a speed bar with smooth curves. In other words, the inbez and outbez values along with the coordinates of the keyframes are plugged into a standard mathematical expression for drawing a bezier curve, and the solution for this expression provides the smooth shape of the speed bar. See, e.g., Pages 489-497 of Foley, J. D., Dam, A. v., Feiner, S. K., and Hughes, J. F.: Computer Graphics, Addison Wesley Publishing Company, Second Edition, 1990.

Figure 11:
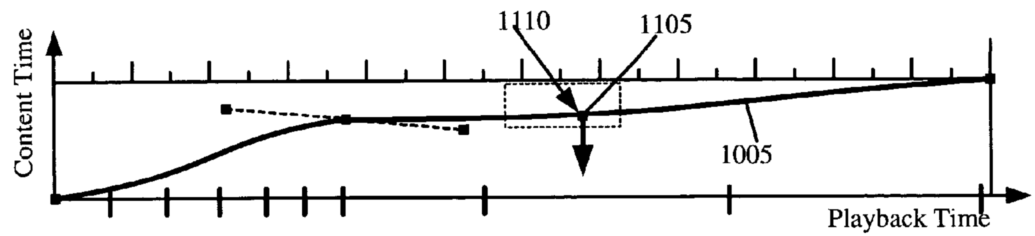
Figure 12:
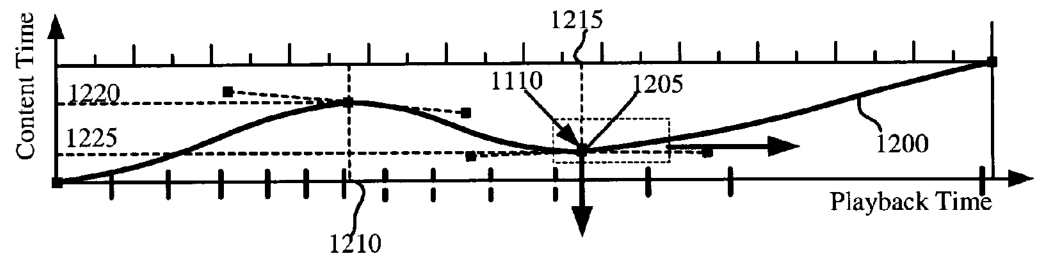

Keyframes can also be used to specify a playback presentation that traverses forwards and backwards through a video clip. FIGS. 11 and 12 present an example that illustrates how this can be achieved in some embodiments. FIG. 11 illustrates the smooth speed bar 1005 of FIG. 10 after a user has started a click-and-drag operation. In this example, the user has started this operation by clicking at location 1105 of the speed bar 1005. This clicking creates a keyframe 1110 at this location. The user then drags the cursor down from position 1105 to position 1205, which is illustrated in FIG. 12, and then ends the click-and-drag operation (e.g., releases the mouse button). The user can also specify inbez and outbez knobs for the keyframe 1110 by pressing the control key, performing a click-and-hold operation on the keyframe 1110, and then choosing a “smooth” option in a menu that appears after the click.

As shown in FIG. 12, the result of this click-and-drag operation is a speed bar that traverses forward through the video clip from the start of the playback time to playback time 1210, then traverses backwards through the video clip from the playback time 1210 to the playback time 1215, and then starts traversing forwards again from playback time 1215 to the end of the playback interval. This traversal means that the playback presentation first displays the video clip in a forward direction up to clip time 1220, then displays the video clip in a backward direction from clip time 1220 to clip time 1225, and then displays the video clip in the forward direction from clip time 1225 until the end of the clip. The speed of these forward and backward segments is dictated by the slope of the speed bar at each time instance in these segments.

Figure 13:
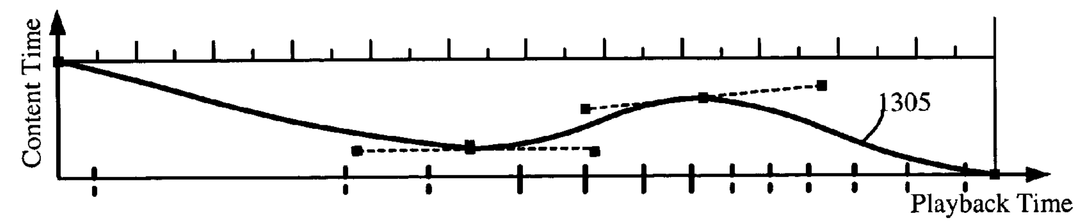

FIG. 13 illustrates that some embodiments allow the editor to flip the speed bar about its x-axis (i.e., about the playback timeline 115). Specifically, this figure illustrates a speed bar 1305 that is a symmetrical equivalent of the speed bar 1200 illustrated in FIG. 12. The speed bar 1305 has been obtained by flipping the speed bar 1200 about its x-axis. In other words, the speed bar 1305 specifies a playback presentation that is in a reverse order from the playback presentation specified by the speed bar 1200 of FIG. 12.

Figure 14:
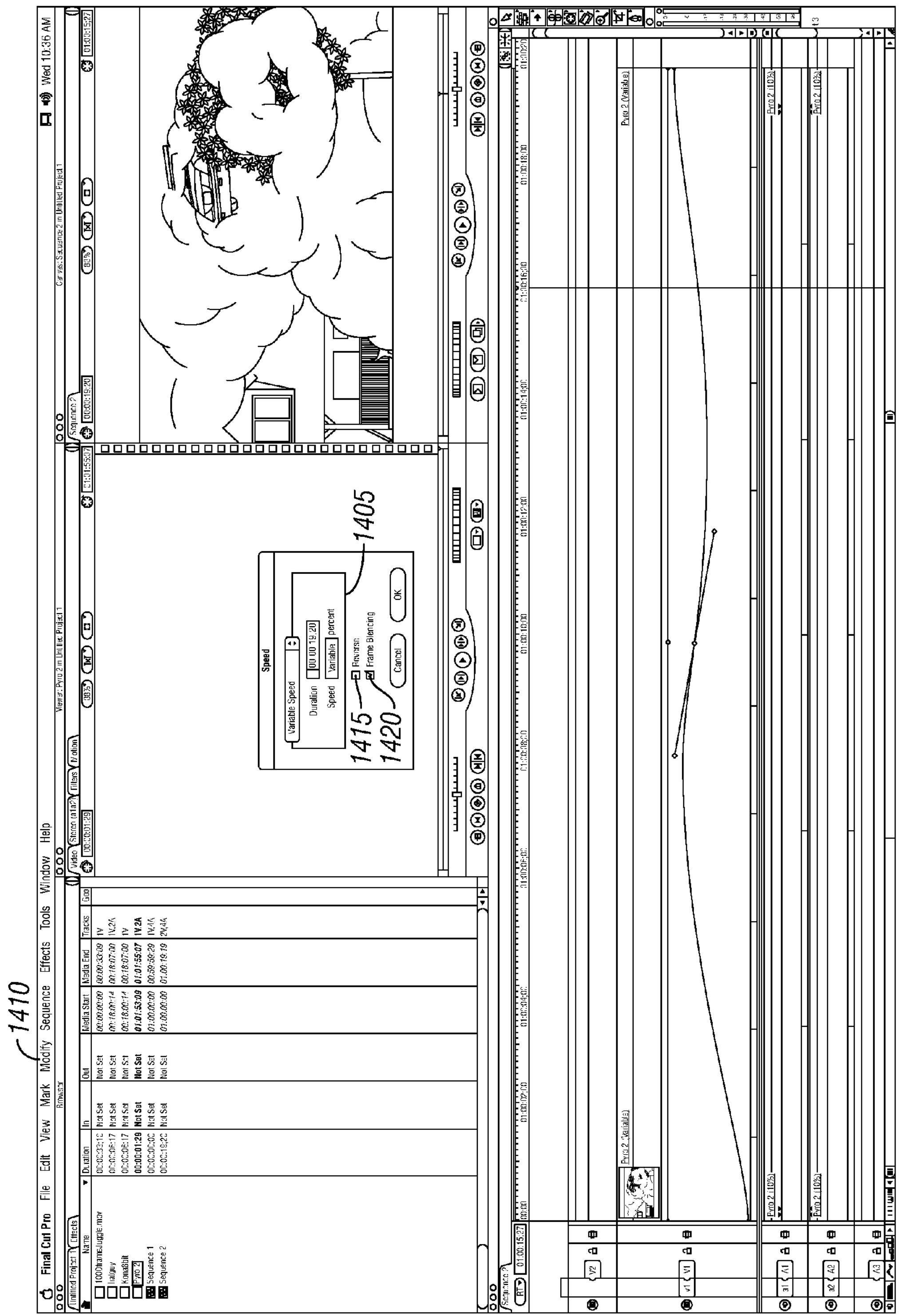

FIG. 14 illustrates a speed dialog box 1405 that an editor can use to reverse the order of a speed bar. In some embodiments, the editor can view this dialog box by selecting a speed menu item under the Modify 1410 in the menu. The editor can then click the reverse box 1415 to direct the editing application to reverse the order of the speed bar. As shown in FIG. 14, the speed dialog box 1405 also allows the editor to click a frame-blending box 1420, which directs the editing application to perform frame blending during the playback of the speed effects. The editing application's frame blending operation will be further described below. As further shown in this figure, the speed dialog includes a drop-down window that allows the editor to select a variable speed option, which changes a constant slope speed bar to a speed bar with a variable slope (i.e., changes a straight-line speed bar to a curved speed bar).

II. Software Architecture

FIG. 15 illustrates the software architecture of some embodiments of the invention. As shown in this figure, this architecture includes a video editing application 1510, a data storage 1505, an effects manager 1515, and a frame buffer 1520. The editing application allows an editor to create video presentations by editing and combining one or more video clips, one or more audio tracks, and/or one or more video or audio effects. The editor interfaces with the video editing application 1510 through a graphical user interface (such as the ones illustrated in FIGS. 2, 4, and 14). This GUI includes the invention's speed bar whose operations and attributes were described above. Accordingly, the video editing application 1510 receives an editor's speed effects selections through its GUI and its associated speed bar. Based on these received effects, the video editing application generates the speed bar and its associated attributes. The generation of this graph will be further described below by reference to FIG. 16.

The video editing application 1510 retrieves video clips and audio tracks from the data storage 1505. It also uses this data storage to store the presentations that it creates and renders. During the editing process, this application 1510 uses the effects manager 1515 to apply its effects in real-time. Specifically, each time the editor enters a new speed effect or modifies an existing, effect the editing application 1510 submits the speed effect additions or modifications to the effects manager 1515. During the real-time playback preview of the speed effects, the effects manager 1515 then retrieves frames individually from the data storage 1505, and provides frames individually to the editing application 1510, based on the speed effects that it previously received from the editing application 1510. The editing application then decompresses and, when needed, blends the frames that it receives from the effects manager. This application then stores the decompressed and potentially frame-blended data in the frame buffer for display in a preview window of its GUI. The operation of the editing application 1510 and the effects manager 1515 will be further described below by reference to FIGS. 17 and 18. In some embodiments, the effects manager is part of the QuickTime engine of Apple Computer, Inc.

Figure 16:
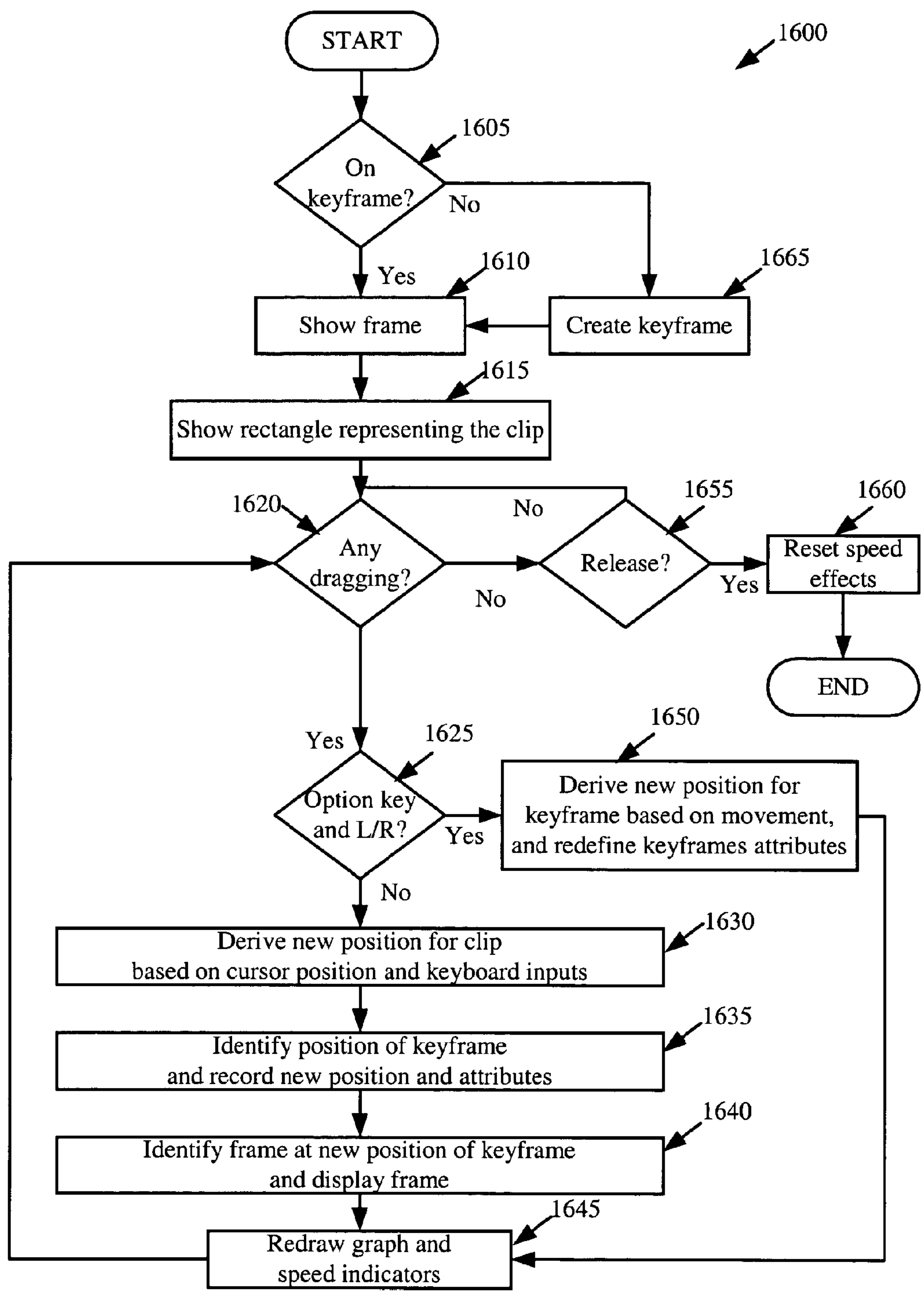
FIG. 16 illustrates a process that the video editing application performs each time that it potentially receives speed effect additions or modifications through a speed bar displayed in its GUI.

FIG. 16 illustrates a process 1600 that the video editing application performs each time that it potentially receives speed effect additions or modifications through a speed bar displayed in its GUI. This process starts when the editing application detects a click event, which might signify a potential modification to the speed bar. For instance, the editing application detects such a potential modification when the editor clicks on a speed bar displayed in the application's GUI, or when the editor clicks somewhere in a video track after selecting the speed-effects icon 425.

As shown in FIG. 16, this process initially determines (at 1605) whether they detected click event (i.e., the event that started the process 1600) selected a previously defined keyframe (e.g., whether the event was a click event was on a previously defined keyframe on the speed bar). If so, the process displays (at 1610) in the GUI preview window the frame currently associated with the selected keyframe. This frame is the frame that appears in the video clips at the current content time value of the selected keyframe.

Next, the process displays (at 1615) the video-clip rectangle 330 about the selected keyframe. The process then determines (at 1620) whether any cursor drag has been detected (by the computer systems I/O drivers) for the click event that started this process. If so, the process then determines (at 1625) whether the option key has been pressed and the cursor movement is in the right or left direction. As mentioned above, some embodiments move the keyframe up or down in response to a right or left click-and-drag operation when the option key is not pressed, but move the keyframe left or right in response to a left or right click-and-drag operation when the option key is pressed.

When the process determines (at 1625) that the option key has not been pressed or that the cursor movement is not in the left or right direction, it transitions to 1630. At 1630, the process derives the new position of the video-clip rectangle 330 based on the keyboard input and the cursor movement. As mentioned above, some embodiments move the video-clip rectangle by 10% intervals when the shift key is pressed during a click-and-drag operation, while scrolling through the frames one frame at a time when the command key is pressed during a click-and-drag operation. This is the reason why the process 1600 identifies (at 1630) the video-clip rectangle's new position based not only on the cursor movement but also on the keyboard input.

Next, the process identifies (at 1635) a new position of the selected keyframe based on the keyboard input and the cursor movement. The identification at 1635 of the keyframe position is analogous to the identification at 1630 of the video-clip rectangles new position. In fact, in some embodiments, the process 1600 derives (at 1635) the new keyframe location from the new video-clip rectangle position identified at 1630. Conversely, some embodiments first identify the new keyframe position, and then based on this position identify the new position of the video-clip rectangle at 1635.

At 1635, the process records the identified new position of the keyframe (i.e., the keyframe's playback and content time values) in the keyframe's data structure. At this stage, the process does not need to record new inbez and outbez values in this data structure as these values have not changed. (These values change when the editor manually moves one or both of the knobs, and at that time, the application records these new values and modifies the speed bar.) After 1635, the process identifies (at 1640) the frame that appears in the video clip at the selected keyframe's content time value, which was just set at 1635. The process displays (at 1640) this frame in the preview window of the GUI. Next, the process (at 1645) redraws the speed bar based on the attributes of this bar's keyframes and known mathematical expressions for drawing straight lines and/or bezier curves based on such attributes. At 1645, the process also redraws the speed indicators based on the slope of the newly drawn speed bar. From 1645, the process transitions back to 1620. This backward transition will be described further below.

If the process determines (at 1625) that the option key is pressed and that the cursor movement is in the left or right direction, the process derives (at 1650) a new position for the keyframe based on the cursor movement. It then records (at 1650) the identified new position of the keyframe (i.e., the keyframe's playback and content time values) in the keyframe's data structure. The process does not need to record (at 1650) new inbez and outbez values in this data structure since these values do not change by such a drag operation; as mentioned above, in some embodiments, these values change only when the editor manually moves one or both knobs associated with a keyframe. From 1650, the process transitions to 1645, which was described above.

When the process transitions from 1645 to 1620, the process determines whether the cursor is still being dragged. If so, it repeats operations 1625-1650 to modify the speed bar again based on the dragging since the last iteration through 1625-1650. On the other hand, when the process determines (at 1620) that the cursor is no longer being dragged, it determines (at 1655) whether the click event that started this process has terminated (e.g., whether the mouse button has been released). If not, the process returns to 1620, which was described above. Otherwise, the process sends (at 1660) the specified speed effects to the effects manager 1515, and then ends. The setting of the speed effects with the effect manager will be further described below by reference to FIG. 17.

If the process 1600 determines (at 1605) that the click event that started the process 1600 does not select a previously specified keyframe, the process creates (at 1665) a new keyframe at the speed bar location corresponding to the location of the click. At 1665, the process also sets the attributes of the new keyframe in a new data structure for this keyframe. The playback and content time values for this keyframe are the coordinates of the click, while its inbez and outbez values are set to default values. From 1665, the process transitions to 1610, where it displays in the GUI preview window the frame currently associated with the keyframe created at 1665. This frame is the frame that appears in the video clip at the current content time value of the created keyframe. From 1610, the process transitions to 1615, which was described above.

Figure 17:
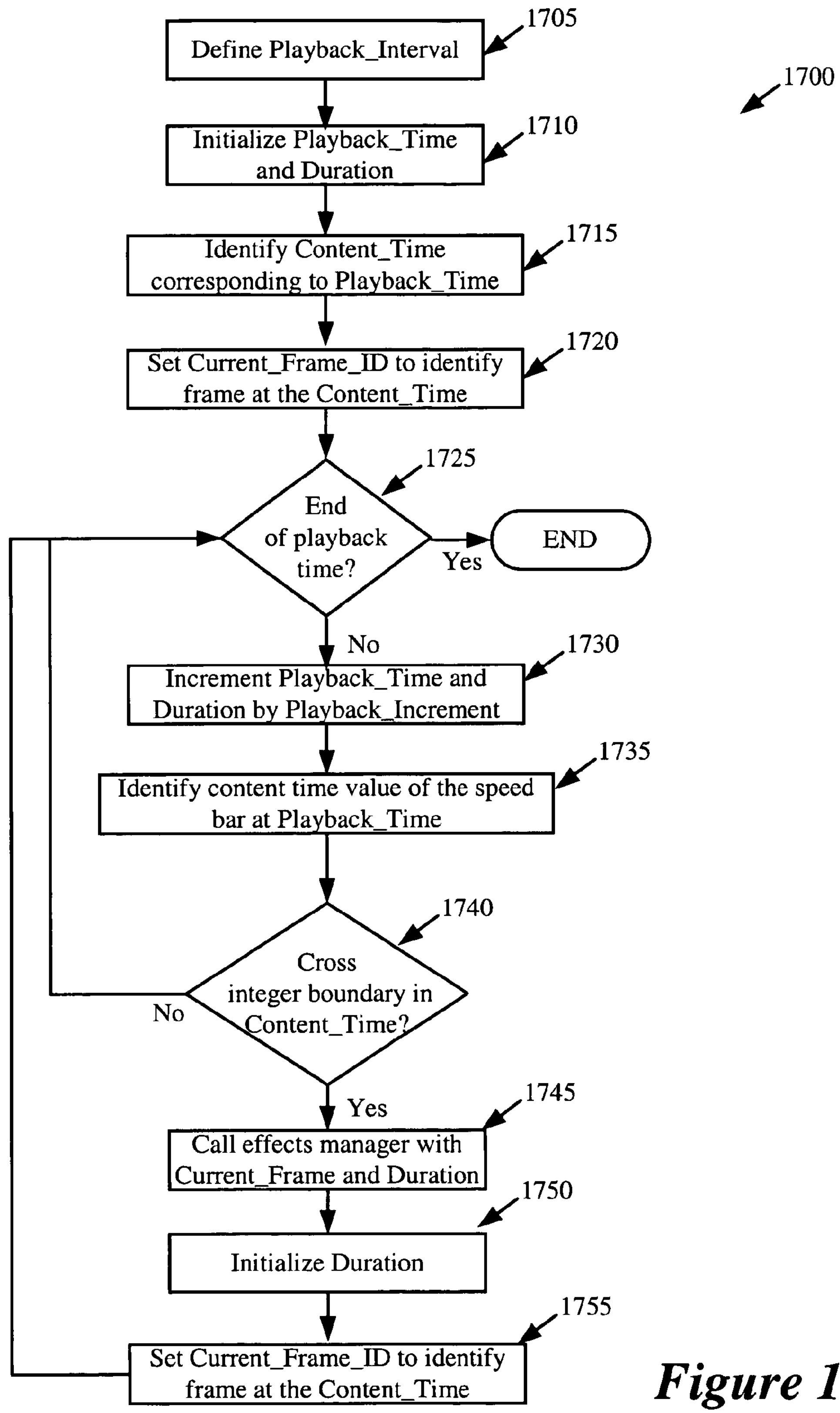
FIG. 17 illustrates a process that a video-editing application performs to relay the speed effects that are defined by a speed bar to an effects manager.

FIG. 17 illustrates a process 1700 that the video-editing application 1510 performs to relay the speed effects that are defined by a speed bar to the effects manager 1515. Essentially, this process walks along the playback timeline 115 at defined increments, and each time it detects a transition along the speed bar from one discrete content-time value to another it sends a set of effects data to the effects manager.

As shown in FIG. 17, the process 1700 initially defines (at 1705) a variable Playback_Interval. In some embodiments, this variable equals 100 sample durations (i.e., the duration of 100 samples, which, in some embodiments, corresponds to one integer value along the content timeline). Next, at 1710, the process then initializes a variable Playback_Time to the start of the playback timeline, and initializes a variable Duration to 0. The process then sets (at 1715) a variable Content_Time, which is the content-time value of the speed bar at playback-time value Playback_Time. It then sets (at 1720) a variable Current_Frame_Id to a value that identifies the frame that appears in the video clip at the identified Content_Time. In some embodiments, the Current_Frame_Id is the identified Content_Time after this time is adjusted for the media offset.

At 1725, the process determines whether Playback_Time corresponds to the playback interval. If so, the process ends. If not, the process increments the variables Playback_Time and Duration by the Playback_Interval. It then identifies (at 1735) the content-time value of the speed bar at the current Playback_Time. Next, the process determines (at 1740) whether the content time identified at 1735 when rounded down is different than the rounded down value of the Content_Time variable. If not, the process returns back to 1725.

If so, the process calls (at 1745) the effects manager with the values for the variables Current_Frame_Id and the Duration. The process then sets (at 1750) Duration to zero. It then sets (at 1755) Current_Frame_Id to a value that identifies the frame that appears in the video clip at the content-time value identified at 1735. From 1755, the process transitions back to 1725, which was described above.

When the editor selects the frame blending option for a set of speed effects that are specified by a speed bar, the video-editing application performs the process 1700 twice. The first time is exactly as described above. The second time, however, is slightly different in that in this iteration the process initializes (at 1710) the Playback_Time to the Playback_Interval (which, as mentioned above, equals one integer value along the content timeline) instead of 0. In this manner, the two iterations of the process 1700 direct the effects manager to provide two sets of frame data for the video clip, where the second set is ahead of the first set by one content time integer.

More specifically, for each iteration of the process 1700 that is performed, the effects manager uses the information received through this iteration to supply a stream of frames to the video-editing application. The effects manager can provide its stream of frames at a higher rate than the frame change rate of the playback presentation, if the duration of the Playback_Interval is less than one integer value along the content timeline.

One example of the operation of the operation of the effects manager 1515 and the video editing application 1510 will now be described. Assume that an editor has not selected the frame blending option and that the editor has applied the simple constant speed effect illustrated in FIG. 1B. As mentioned above, this speed effect specifies the playback speed as $1/10^{th}$ the content speed. Assuming that the video clip only contains 30 frames and that the frame rate is 30 fps, this speed effect would require the playback presentation to be 10 seconds long instead of 1 second. So, in this example, each frame would have to be displayed for one-third of a second. Assuming that the effects manager provides a new frame to the video-editing application at each one-ninth of a second, the effects manager would provide each frame to the video-editing application three times.

Now, assume that in the example above the editor had selected the frame-blending option. In this case, the video-editing application would perform the process 1700 twice, once as described above and once with the Playback_Time initialized (at 1710) to the Playback_Interval. In this case, FIG. 18 illustrates that the effects manager would provide two sets of frames (set A and set B) to the video-editing application. Specifically, each one-ninth of a second, the effects manager would provide two new frames (one from set A and one from set B) to the video-editing application. As shown in this figure, the frame set B is always ahead of frame set A by one frame.

When the video-editing application receives a frame from the effects manager, it decompresses the frame. If frame blending has not been selected, the video-editing application receives only one frame at a time. Hence, after decompressing this frame, it writes the decompressed frame into the frame buffer 1520. On the other hand, when frame blending is selected, the video-editing application receives two frames at a time. It decompresses both these frames, and then uses standard frame blending techniques to blend the two frames. The application then writes the result of the blending into the frame buffer.

For instance, as mentioned above, the effects manager provides two different frames to the video-editing application each one-ninth of a second in the example illustrated in FIG. 18, as frame blending was selected in this example. In this case, one way for the video-editing application to perform frame blending is to multiply the frame from set A by a blending parameter alpha, multiply the frame from set B by a blending parameter beta, and then add the results of these multiplications. At the start of a frame transition along each set, the blending parameter alpha is larger than the blending parameter beta, while at the end of a frame transition along each set, the blending parameter alpha is smaller than the blending parameter beta. For instance, alpha is larger than beta for blending frames 1805 and 1810 and blending frames 1815 and 1820, but it is smaller than beta for blending frames 1825 and 1830 and blending frames 1835 and 1840. This fluctuation of alpha and beta values allows the video-editing application to display a video clip where the images would blend from one video clip to the next.

Figure 19:
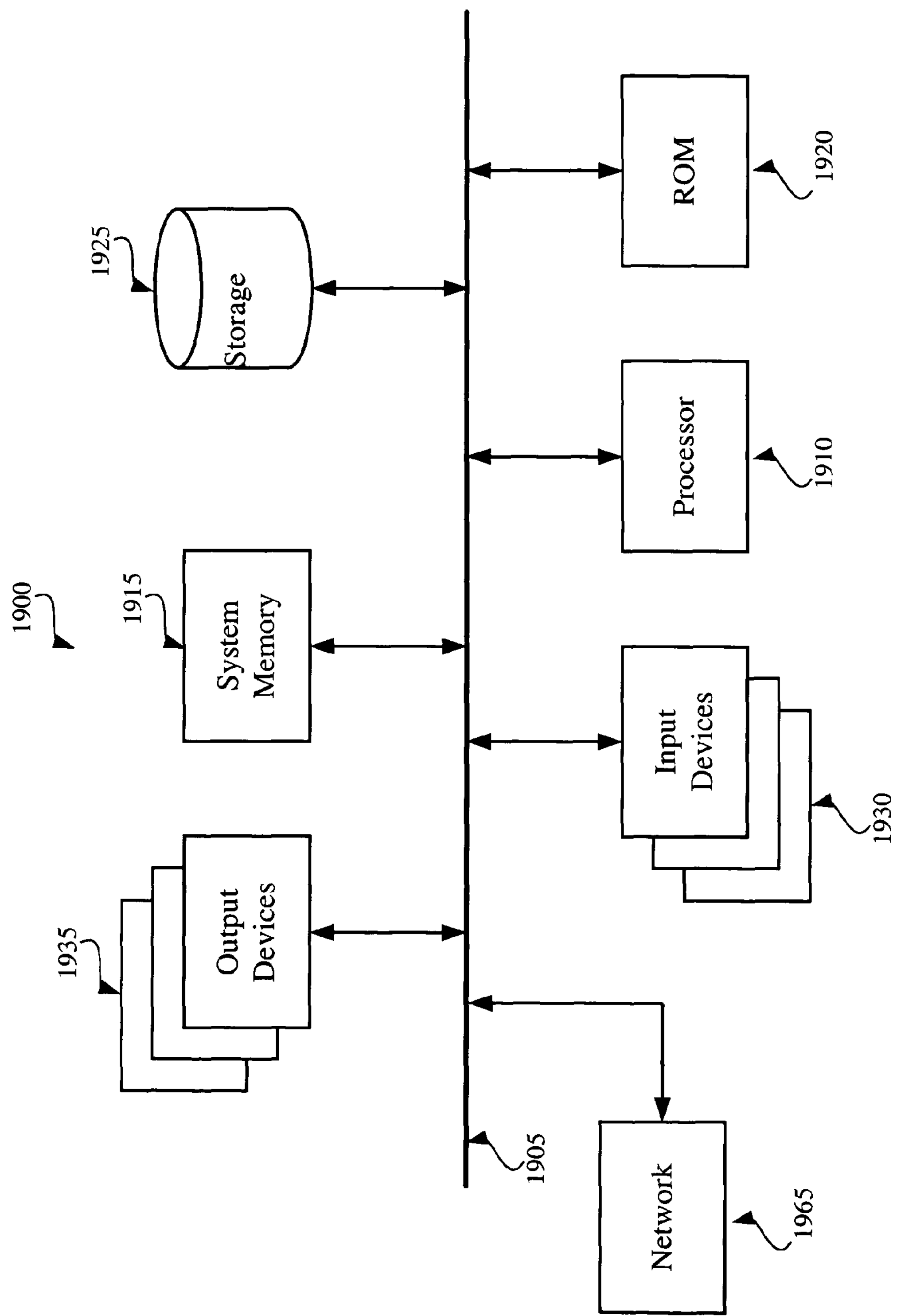
FIG. 19 presents a computer system with which one embodiment of the invention is implemented.

FIG. 19 presents a computer system with which one embodiment of the invention is implemented. Computer system 1900 includes a bus 1905, a processor 1910, a system memory 1915, a read-only memory 1920, a permanent storage device 1925, input devices 1930, and output devices 1935. The bus 1905 collectively represents all system, peripheral, and chipset buses that communicatively connect the numerous internal devices of the computer system 1900. For instance, the bus 1905 communicatively connects the processor 1910 with the read-only memory 1920, the system memory 1915, and the permanent storage device 1925.

From these various memory units, the processor 1910 retrieves instructions to execute and data to process in order to execute the processes of the invention. The read-only-memory (ROM) 1920 stores static data and instructions that are needed by the processor 1910 and other modules of the computer system.

The permanent storage device 1925, on the other hand, is read-and-write memory device. This device is a non-volatile memory unit that stores instruction and data even when the computer system 1900 is off. Some embodiments of the invention use a mass-storage device (such as a magnetic or optical disk and its corresponding disk drive) as the permanent storage device 1925.

Other embodiments use a removable storage device (such as a floppy disk or Zip® disk, and its corresponding disk drive) as the permanent storage device. Like the permanent storage device 1925, the system memory 1915 is a read-and-write memory device. However, unlike storage device 1925, the system memory is a volatile read-and-write memory, such as a random access memory. The system memory stores some of the instructions and data that the processor needs at runtime. In some embodiments, the invention's processes are stored in the system memory 1915, the permanent storage device 1925, and/or the read-only memory 1920.

The bus 1905 also connects to the input and output devices 1930 and 1935. The input devices enable the user to communicate information and select commands to the computer system. The input devices 1930 include alphanumeric keyboards and cursor-controllers. The output devices 1935 display images generated by the computer system. For instance, these devices display IC design layouts. The output devices include printers and display devices, such as cathode ray tubes (CRT) or liquid crystal displays (LCD).

Finally, as shown in FIG. 19, bus 1905 also couples computer 1900 to a network 1965 through a network adapter (not shown). In this manner, the computer can be a part of a network of computers (such as a local area network ("LAN"), a wide area network ("WAN"), or an Intranet) or a network of networks (such as the Internet). Any or all of the components of computer system 1900 may be used in conjunction with the invention. However, one of ordinary skill in the art would appreciate that any other system configuration may also be used in conjunction with the present invention.

The invention described above allows an editor to add or modify speed effects to a video clip quickly and intuitively. It also provides the editor with an immediate feedback of the changes by displaying the affected frames in a preview window. Moreover, the invention's ability to apply speed effects in real-time makes the editing process much faster. When the editor completes editing speed effects and viewing real-time application of these speed effects, the video-editing application can then perform the more time-consuming rendering operation that renders the video clip to file. To perform this rendering operation, the video editing application uses standard rendering techniques.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A non-transitory computer readable medium storing a program for specifying playback speed effects for playing a video clip, the program comprising sets of instructions for:
- receiving a set of playback speed effects for the video clip through a selectable graph that is displayed on a display device, said graph correlating playback times of the video clip with content times of the video clip;
- indicating a first portion of said graph that represents forward playback with a first set of markers of a first color;
- indicating a second portion of said graph that represents backward playback with a second set of markers of a second color, wherein said second color is different from said first color; and
- displaying a presentation of the video clip that accounts for the set of playback speed effects defined for the video clip.

2. The non-transitory computer readable medium of claim 1, wherein said graph comprises a first axis and a second axis, and wherein said first set of markers and said second set of markers are displayed along said first axis.

3. The non-transitory computer readable medium of claim 2, wherein said first axis represents a playback-time of the video clip and said second axis represents a content-time of said video clip, any two markers in said first set of markers that are adjacent to each other represent a same content-time interval between the two adjacent markers, a first pair of adjacent markers is a first distance apart from each other, a second pair of adjacent markers is a second distance apart from each other, and said first distance is not equal to said second distance.

4. The non-transitory computer readable medium of claim 3, wherein any two markers in said second set of markers that are adjacent to each other represent a same negative content-time interval between the two adjacent markers, a first pair of adjacent markers is a first distance apart from each other, a second pair of adjacent markers is a second distance apart from each other, and said first distance is not equal to said second distance.

5. The non-transitory computer readable medium of claim 4, wherein said same negative content-time interval is equal in magnitude to said same content-time interval.

6. The non-transitory computer readable medium of claim 1, wherein said graph comprises a line bar, wherein said program further comprises sets of instructions for:
- indicating said first portion of the graph with a positive slope of said line bar; and
- indicating said second portion of the graph with a negative slope of said line bar.

7. The non-transitory computer readable medium of claim 6, wherein said first set of markers and said second set of markers are displayed below said line bar.

8. The non-transitory computer readable medium of claim 1, wherein the program further comprises a set of instructions for moving a first marker of said first set of markers closer to a second marker of said first set of markers in response to a modification of the graph that speeds up said forward playback between playback times identified by the first and second markers.

9. The non-transitory computer readable medium of claim 1, wherein the program further comprises a set of instructions for generating new markers in said second set of markers in response to a modification of the graph that increases the amount of content-time that is played backward.

10. A non-transitory computer readable medium storing a program for specifying playback speed effects for playing a video clip, the program comprising sets of instructions for:

displaying a selectable graph on a display device, said graph correlating playback times of the video clip with content times of the video clip;

receiving a set of playback speed effects for the video clip through a set of modifications of the selectable graph, wherein a modification to the selectable graph comprises a selection and movement of a portion of the graph;

displaying a movable box around a selected portion of the graph while the portion is being moved; and changing a position of said movable box with respect to said portion as the portion is moved, wherein the position of the movable box with respect to said portion indicates a content time of the video clip.

11. The non-transitory computer readable medium of claim 10, wherein said selected portion indicates a playback time and a content time of the video clip.

12. The non-transitory computer readable medium of claim 10, wherein said box is positioned so that the selected portion of the graph is a fraction of the width of the box from an end of the box, wherein said fraction is proportional to the content time of the video clip represented by said selected portion compared to the full duration of the content of the video clip played at normal speed.

13. The non-transitory computer readable medium of claim 10, wherein the program further comprises a set of instructions for receiving a movement of the selected portion of the graph to increase the content time of the video clip at a given playback time, wherein said box moves with said selected portion and also moves relative to said selected portion of the graph, wherein said movement relative to said selected portion is proportional to said increase in the content time.

14. The non-transitory computer readable medium of claim 10, wherein the program further comprises a set of instructions for receiving a movement of the selected portion of the graph to increase the playback time of the video clip for a given content time, wherein said box moves with said selected portion and does not move relative to said selected portion.

15. A non-transitory computer readable medium storing a program for specifying playback speed effects for playing a video clip, the program comprising sets of instructions for:

receiving a set of playback speed effects for the video clip through a set of modifications of a selectable graph that is displayed on a display device, wherein the selectable graph represents a playback-time at multiple points in said video clip in relation to a content-time at said multiple points in said video clip, wherein the set of modifications comprises a set of click-and-drag operations; and displaying in real-time a presentation of the video clip that accounts for the set of playback speed effects defined for the video clip.

16. The non-transitory computer readable medium of claim 15, wherein the set of playback speed effects comprises speeding up a portion of the playback.

17. The non-transitory computer readable medium of claim 15, wherein the set of playback speed effects specifies a plurality of playback speeds for a plurality of intervals of said video clip.

18. The non-transitory computer readable medium of claim 15, wherein the program further comprises a set of instructions for converting the click-and-drag operation into a set of playback speed effect definitions.

19. The non-transitory computer readable medium of claim 15, wherein the set of instructions for receiving said click-and-drag operation comprises a set of instructions for monitoring a location of a cursor controlled by an electronic input device and a status of buttons of the electronic input device.

20. The non-transitory computer readable medium of claim 19, wherein the set of instructions for receiving said click-and-drag operation comprises a set of instructions for receiving a selection, from the electronic input device, of a portion of the graph that appears at a first location within a window containing the graph and receiving an input from the electronic input device commanding a movement of the selected portion to a second location within the window.

* * * * *